United States Patent

Kiefer

[11] 4,170,621
[45] Oct. 9, 1979

[54] THERMOFORMING APPARATUS AND METHOD OF MOTION CONTROL

[75] Inventor: Günther Kiefer, Schwaigern, Fed. Rep. of Germany

[73] Assignee: Adolf Illig Maschinenbau GmbH & Co., Heilbronn, Fed. Rep. of Germany

[21] Appl. No.: 943,977

[22] Filed: Sep. 20, 1978

[30] Foreign Application Priority Data

Sep. 24, 1977 [DE] Fed. Rep. of Germany ....... 2743058

[51] Int. Cl.² .............................................. B29C 17/03
[52] U.S. Cl. ................... 264/322; 264/40.5; 264/550; 425/394; 425/398; 425/412; 425/423; 425/78; 425/406
[58] Field of Search .................. 425/78, 25, 394, 398, 425/412, 415, 423, 23, 24, 22, 406; 264/40.5, 550, 322

[56] References Cited

U.S. PATENT DOCUMENTS

| | | | |
|---|---|---|---|
| 3,496,257 | 2/1970 | Brown et al. .................. | 264/40.5 X |
| 3,559,243 | 2/1971 | Hermes .......................... | 425/78 |
| 3,679,803 | 7/1972 | Palencher ...................... | 425/398 X |
| 3,752,622 | 8/1973 | Viadana ......................... | 425/78 |
| 3,799,727 | 3/1974 | Howard .......................... | 425/394 |
| 3,816,052 | 6/1974 | Schoppee et al. ............. | 425/406 |
| 3,990,822 | 11/1976 | MacMillan ..................... | 425/25 |
| 4,057,380 | 11/1977 | Hosoe ............................ | 425/398 X |

*Primary Examiner*—J. Howard Flint, Jr.
*Attorney, Agent, or Firm*—Spencer & Kaye

[57] ABSTRACT

A method of controlling the reciprocating motion of a mold-carrying platen in a thermoforming apparatus which includes a driven cam disc operatively connected to the platen to move the platen in each cycle of operation upward from a lower, open position to an upper, closed position, to maintain the platen in the upper position, to move the platen downward from the upper position to the lower position and to maintain the platen in the lower position. The method comprises the step of selectively driving the cam within each cycle of operation with a first rpm for determining a maximum speed for the upward motion of the platen and a minimum dwelling period in the lower position and a second rpm for determining a minimum dwelling period in the upper position and a maximum speed for the downward motion of the platen. The second rpm is set as a function of the properties of the article manufactured by the thermoforming apparatus. The driving step includes the step of switching from one of the rpm's to the other as a function of the angular position of the cam disc.

7 Claims, 6 Drawing Figures

1

THERMOFORMING APPARATUS AND METHOD OF MOTION CONTROL

BACKGROUND OF THE INVENTION

This invention relates to a thermoforming apparatus and a method of controlling the motion of a mold-carrying platen by means of a cam disc. The thermoforming apparatus has a mechanism for receiving a reel of a thermoplastic sheet, a cyclically operating sheet feeding mechanism, a heating arrangement for heating portions of the thermoplastic sheet and a mold station in which the heated sheet portions are sequentially deformed by means of a differential pressure. The mold station includes a cam disc as well as an associated drive to effect the reciprocating motion of the mold-carrying platen. The mold station may be so designed that it includes stamping tools so as to simultaneously serve as a stamping station. It is, however, feasible to arrange a separate stamping station downstream of the thermoforming apparatus for removing the shaped article from the continuous thermoplastic sheet.

The cam disc may drive the mold platen directly from below or it may be connected with the platen by means of a linkage drive which then imparts the reciprocating motion to the platen. This latter alternative is disclosed, for example, in U.S. Pat. No. 3,816,052.

The cam disc is usually driven by means of a variable speed drive to set the rpm of the cam disc and thus predetermine the cycle of the thermoforming apparatus and to adapt it to the mold in a stepless manner.

Prior to discussing the disadvantages of the above-outlined conventional operational method, first the steps within one operational cycle will be set forth in more detail.

Subsequent to introducing a heated sheet portion into the mold station, the platen, together with the lower mold half, is raised and the sheet is tensioned between the two mold halves. The article to be manufactured is formed by introducing into the mold pressurized air which causes the thermoplastic sheet material to conform to the mold wall. This condition should be maintained for a certain period of time to ensure that the deformed sheet can cool in the deformed position. Thereafter, the platen is moved downwardly. This motion may be preceded by a short upward movement, during which the article is stamped out of the sheet. In the open position of the mold, the next sheet portion is fed into the mold station. Thereafter, the next operational cycle begins.

During one cycle of operation, the following significant consecutive time periods occur:

(a) duration of the lifting stroke of the platen;
(b) dwelling period in the upper position of the platen for deformation and cooling;
(c) duration of the return stroke of the platen; and
(d) dwelling period in the lower position of the platen during the advance of the thermoplastic sheet.

The dwelling period identified under (b) is in a large measure dependent on the type of the thermoplastic sheet, the sheet thickness, the mold temperature and the shape of the mold. The periods identified under (a) and (d) are essentially independent of the properties of the article, that is, for a particular thermoforming apparatus minimum periods can be assigned. They depend essentially on the established output, the component masses to be accelerated and braked, the platen stroke and the sheet feed. The period identified under (c) for lowering the platen may be dependent on the article, at least at the beginning of the downward motion, since in case of certain shapes (vertical walls, thin walls or undercut portions) it is not feasible to move the mold downwardly at an arbitrarily high speed because the article may be damaged. At the end of the downward motion, the downwardly directed velocity is again dependent from the masses which have to be braked.

In case of articles which require a long dwelling period (b) and/or a slow return stroke (c) of the platen, it has been necessary to set the rpm of the cam disc drive at a low value. This necessarily has resulted in a small cycle number, because the periods (a) and (d) were necessarily also lengthened, although such a lengthening of these two last-named periods is not needed either from the point of view of the apparatus or the product manufactured.

In order to eliminate the above-discussed disadvantage, it has been heretofore known only to drive the cam disc by means of a brake-and-clutch combination and to stop the cam disc in the upper position of the platen for a short period. In this manner, to be sure, an extension of the dwelling period could be achieved. This method, however, is not adapted to also reduce the speed of the return motion of the platen so that, at least in case of products that require a slow deformation, a low rpm has to be set for the cam disc. Further, the braking of the cam disc and its restarting to a cycle of approximately 30/min or above has caused a significant wear of the brake and clutch. This has required the replacement of these components a relatively short service life. All this has resulted in long maintenance periods and high costs.

SUMMARY OF THE INVENTION

It is an object of the invention to provide an improved method of the above-outlined type for controlling the motion of the platen within each cycle in such a manner that there is achieved an optimal adaptation of the dwelling period of the platen in the upper position and/or the downward speed thereof to the product to be manufactured without, at the same time, affecting the periods for the upward motion of the platen and the dwelling time of the platen in its lower position, so that these last-named periods may be set independently of the article to an optimal value, dependent upon the machine to thus achieve an increase in the output of the thermoforming apparatuses. It is a further object to ensure a low-friction operation.

These objects and others to become apparent as the specification progresses, are accomplished by the invention, according to which, briefly stated, the cam disc during each full revolution (corresponding to one operational cycle) is driven with two different rpm's, that is, with a first rpm which is adapted to the thermoforming apparatus and with a second rpm which is selected dependent upon the product and which can be selectively made effective for the dwelling period in the upper position of the platen for its downward motion or for both.

The thermoforming apparatus which performs the above-defined method has a drive which can supply two rmp's in a rapid sequence and with low friction.

BRIEF DESCRIPTION OF THE PREFERRED EMBODIMENT

Figure 1:
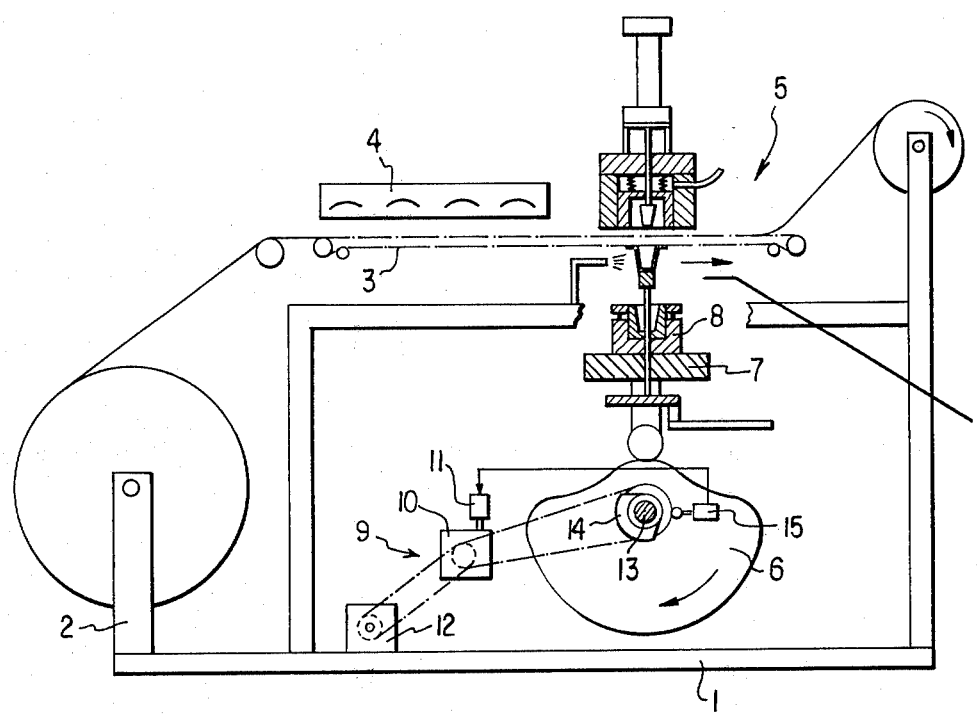
FIG. 1 is a schematic side elevational view of a thermoforming apparatus incorporating a preferred embodiment of the invention.

Turning now to FIG. 1, the thermoforming apparatus in essence comprises a frame 1, a supply reel bracket 2, a cyclically operating web advancing device 3, a heater 4 disposed adjacent a portion of the web, a mold station 5 which, in the embodiment illustrated, simultaneously serves as a stamping station, a cam disc 6 for effecting a vertical reciprocating motion of a platen 7 which carries a lower mold half 8 and a drive 9 for rotating the cam disc 6. The general course of motion of the platen as well as the molding process in a thermoforming apparatus are known and are therefore not discussed in detail.

The various operational phases concerning the motion of the mold platen are shown in the diagrams of FIGS. 2 through 6. Each diagram contains an upper curve representing the rpm of the cam disc 6 as a function of time and a lower curve representing the course of motion of the platen 7 as a function of time.

In general, the motion of the platen 7 has the following course: upward stroke—dwelling in the upper position—downward stroke—dwelling in the lower position. The cam face of the cam disc 6 is so divided that the upward motion of the platen occurs during a 60° revolution of the cam disc 6, the dwelling in the upper position occurs during a 180° rotation, the return stroke during a 60° rotation and the dwelling in the lower position during a 60° revolution. The diagrams of FIGS. 2 through 6 are based on these values and further, for the sake of simplicity, a constant speed during upwards and downwards motion of the platen is assumed. In practice, to be sure, there occurs a smooth transition at the points of reversal due to accelerations and decelerations (braking), yet such smooth transitions do not play any role in the analysis of the method developed by the invention.

Figure 2:
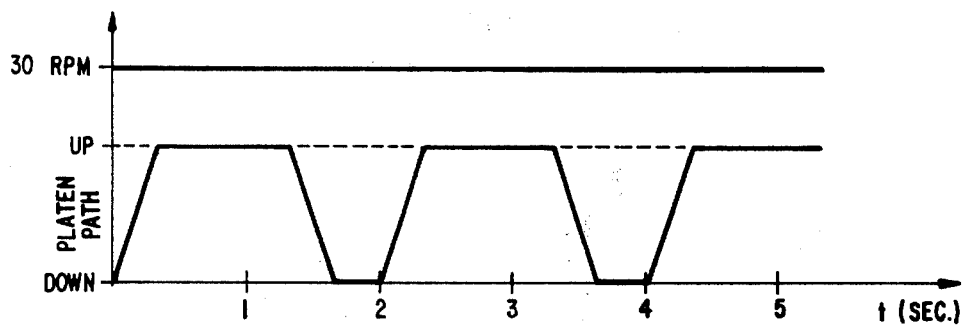
FIGS. 2 and 3 are diagrams illustrating the course of platen motion according to the prior art.

Turning now to the diagram illustrated in FIG. 2, there is shown the course of platen motion when the cam disc 6 is driven constantly at 30 rpm which corresponds to 30 cycles/minute. It is thus assumed that the thermoforming apparatus can normally operate with such a cycle, given a predetermined structure and taking into account the set output and the masses to be moved.

Figure 3:
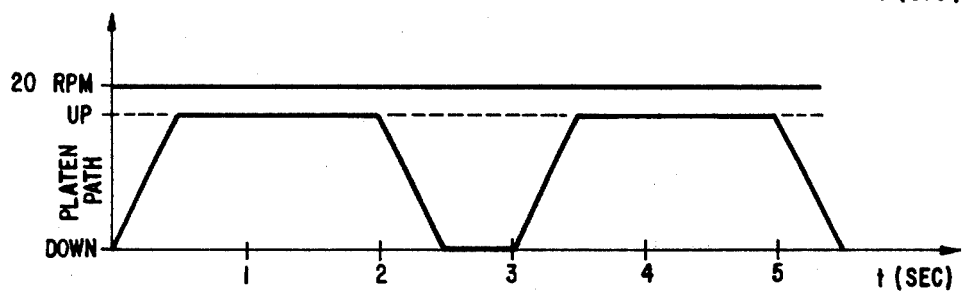

If it is necessary—because of the particular article to be manufactured—to prolong either the molding period or the cooling period (while the platen 7 is at its uppermost position) or to slow down the downward motion, or both, in the conventional drives for the cam disc 6 it has been necessary to reduce the drive, for example, to 20 cycles by means of an adjustable, but thereafter constant rpm. The diagram representing a motion after such a conventional adjustment is illustrated in FIG. 3. Each cycle has thus been extended to now last 3 seconds. It will be further observed that the dwelling time in the lower position and the duration of the upward motion are inherently also lengthened, although such a lengthening is, in itself, unnecessary.

Figure 4:
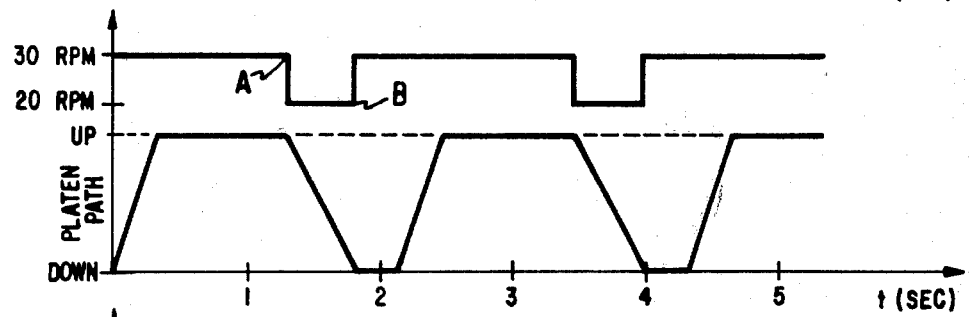
FIGS. 4, 5 and 6 are diagrams illustrating the course of platen motion controlled according to the invention.
Figure 5:
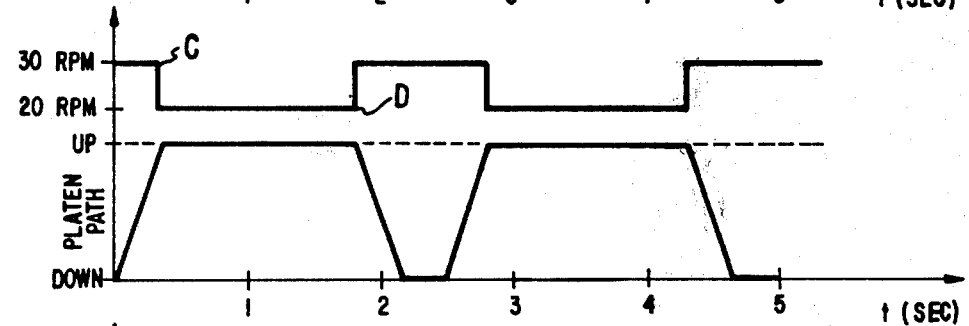
Figure 6:
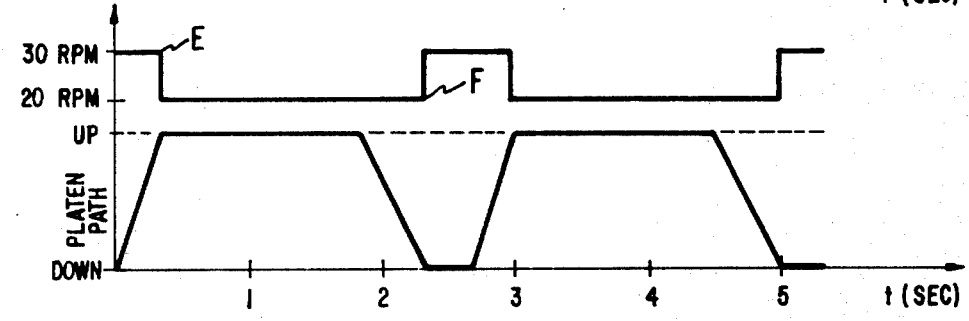

The course of motion of the platen 7 according to the invention is, in case of diverse requirements, illustrated in FIGS. 4, 5 and 6.

In FIG. 4 it has been assumed that only the downward motion of the platen 7 has to be reduced in order to ensure a slower rate of deformation of the product. The cam disc 6 is thus first driven with 30 rpm and then, at the beginning of the downward motion of the platen from point "A" the speed is reduced to 20 rpm. Upon completion of the downward motion, the speed of the drive of the cam disc 6, from point "B" again passes to 30 rpm. The result of this step is a prolonged downward motion, similarly to the FIG. 2 situation, while otherwise the course is similar to FIG. 1, with a cycle time of only 2.16 seconds which corresponds to 27 cycles/minute for the thermoforming apparatus.

Turning now to the diagram illustrated in FIG. 5, it is assumed that only the molding and cooling periods have to be extended, for example, from 1 second (which is the normal speed in a 30 cycle/minute operation) to 1.5 seconds. Upon completion of the upward movement of the platen, from point "C" the rpm of the cam disc is lowered to 20 rpm and only upon the beginning of the downward motion of the platen 7 it is raised again to 30 rpm (point "D").

Thus, one cycle occurs in 2.5 seconds which corresponds to an apparatus speed of 24 cycles/minute.

The diagram of FIG. 6 illustrates a combination of the requirements set for the platen course in FIGS. 4 and 5. Thus, the upper dwelling period and the duration of the downward motion of the platen are slowed down. Therefore, in each cycle, the platen 7 is driven upwardly with a cam speed of 30 rpm and then, upon reaching the uppermost position at moment E, the cam rpm is lowered to 20 rpm. This cam speed is maintained until moment F when the platen reaches its lowermost position. The lower dwelling period which terminates the cycle and the successive upward travel with which the new cycle begins are thus controlled by a cam speed of 30 rpm. As a result, the duration of each cycle is 2.6 seconds which corresponds to an apparatus speed of 22.5 cycles/minute.

In summary, the method according to the invention provides that the cycle of the apparatus can be increased from 20/minute to 27/minute, 24/minute and 22.5/minute, respectively; this corresponds to a significant increase in the output of the thermoforming machine between 35% and 12.5%.

It is to be understood that it is not always necessary to effect the rpm change of the cam disc 6 from the beginning to the end of one of the two periods, namely, the dwelling time of the platen 7 in its upper position and the downward motion thereof. Thus, dependent solely on the required course of motion of the platen 7, the switch from one rpm to the other can be effected at any desired moment.

The difference between the two rpm's may be either constant (such as 10 rpm's which was the case in the above-described example) or may be variable. Similarly, the duration of the changed (decreased) rpm may be controlled either by determining the beginning and the end of such duration as a function of the angular position of the cam disc or by determining only the beginning of the rpm change with the aid of the cam disc position, while setting the end of the duration by a timer. In any event, it is feasible to provide an optimum

United States Patent [19]
Uhlig

[11] 4,170,622
[45] Oct. 9, 1979

[54] METHOD OF MAKING A BLOWN HOLLOW ARTICLE HAVING A RIBBED INTERIOR SURFACE

[75] Inventor: Albert R. Uhlig, Toledo, Ohio

[73] Assignee: Owens-Illinois, Inc., Toledo, Ohio

[21] Appl. No.: 931,655

[22] Filed: Aug. 7, 1978

Related U.S. Application Data

[63] Continuation-in-part of Ser. No. 802,275, May 26, 1977, abandoned.

[51] Int. Cl.$^2$ .............................................. B29C 17/07
[52] U.S. Cl. .................................. 264/520; 264/530; 264/534
[58] Field of Search ................. 264/89, 90, 92, 94, 264/96–99, 296, 520, 529, 530, 531, 534, 535, 537–543; 425/525, 530

[56] References Cited

U.S. PATENT DOCUMENTS

| | | | |
|---|---|---|---|
| 3,398,428 | 8/1968 | Fuerst et al. | 264/98 X |
| 3,956,441 | 5/1976 | Uhlig | 264/98 X |

*Primary Examiner*—Jan H. Silbaugh
*Attorney, Agent, or Firm*—Charles S. Lynch; M. E. Click; D. H. Wilson

[57] ABSTRACT

A method is disclosed for reinforcing hollow articles, such as bottles, blow molded from a heated thermoplastic material. A hollow parison is preformed with concave grooves in its exterior surface and corresponding ribs on its interior surface at locations in which the finished article is to be reinforced. The parison is then blow molded into the finished article. The blowing pressure and the temperature of the thermoplastic material collapse and fuse the concave grooves to form solid reinforcement ribs located inside the article while the exterior of the article has a rib-free surface defined by the blow mold.

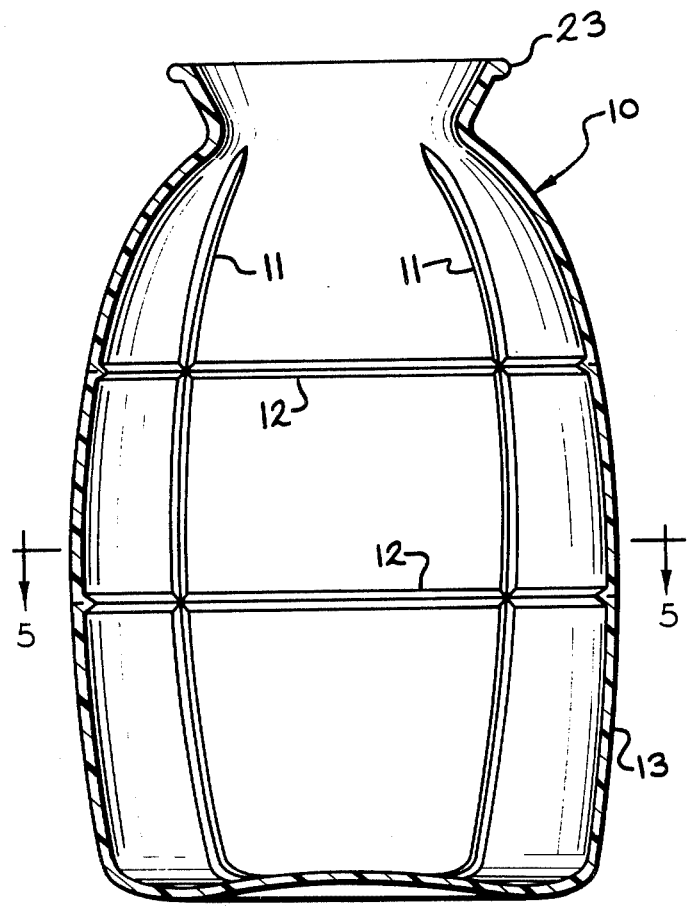

2 Claims, 9 Drawing Figures